June 21, 1960
F. C. HUYSER
2,941,298
EXTENSOMETER
Filed Aug. 21, 1958
2 Sheets-Sheet 1
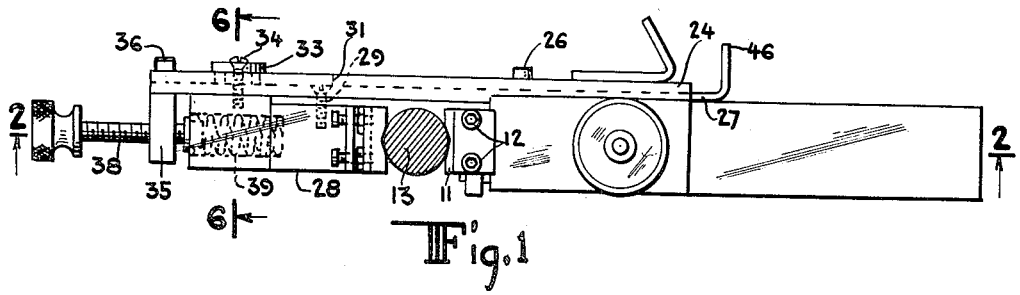
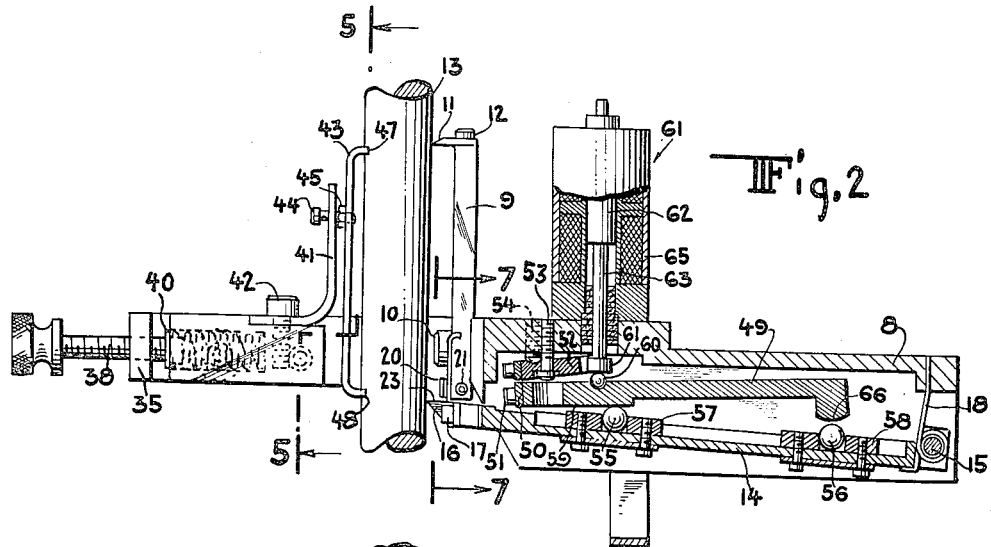
INVENTOR
FRANCIS C. HUYSER
BY Pollard, Johnston, Smythe & Robertson
ATTORNEYS June 21, 1960 F. C. HUYSER 2,941,298
EXTENSOMETER
Filed Aug. 21, 1958 2 Sheets-Sheet 2
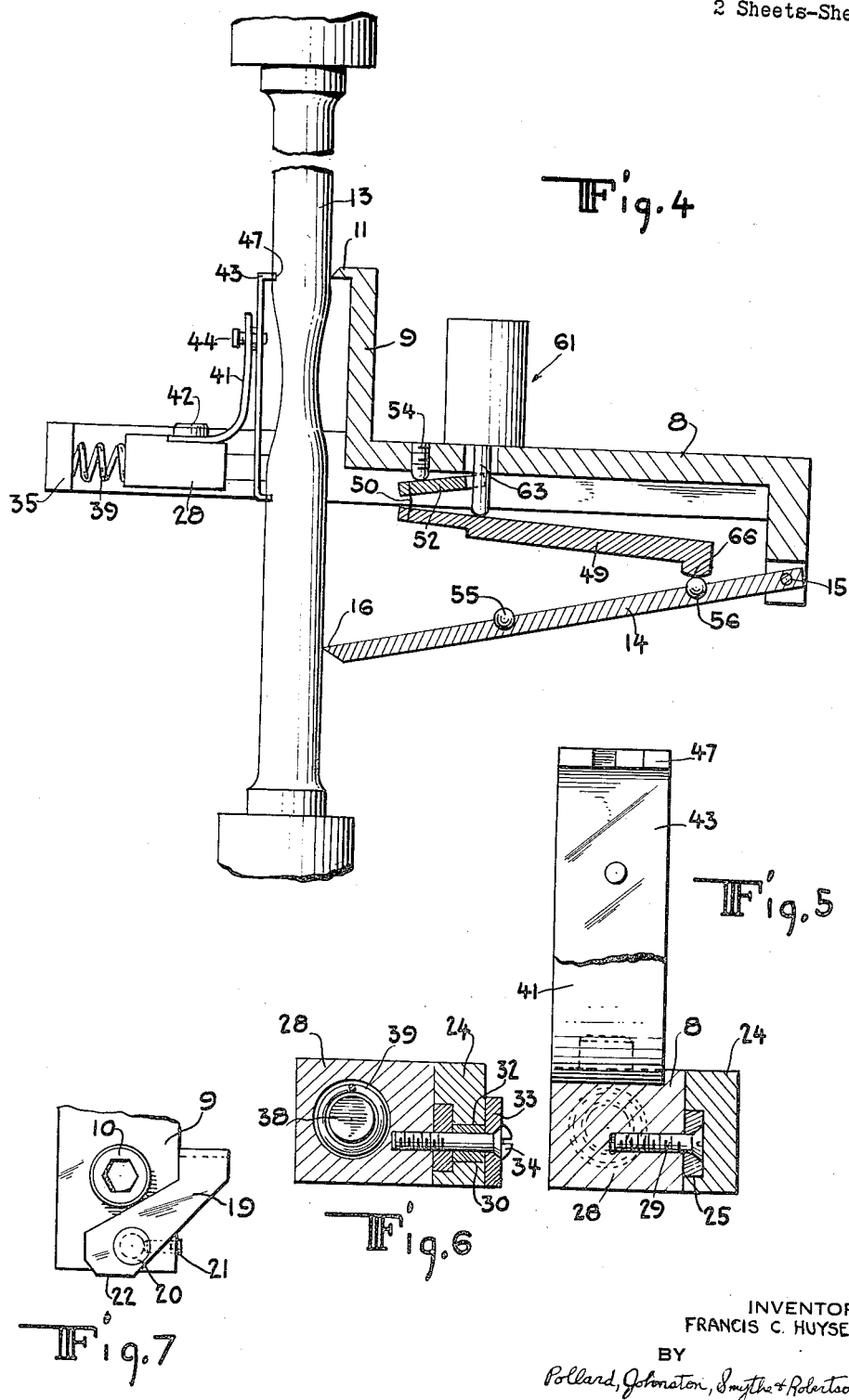
INVENTOR
FRANCIS C. HUYSER
BY
Pollard, Johnston, Smythe & Robertson
ATTORNEYS

United States Patent Office 2,941,298
Patented June 21, 1960

2,941,298
EXTENSOMETER

Francis C. Huyser, Moline, Ill., assignor to American Machine and Metals, Inc., New York, N.Y., a corporation of Delaware Filed Aug. 21, 1958, Ser. No. 756,334

10 Claims. (Cl. 33—148)

This invention relates generally to instruments, and more particularly is directed to improvements in extensometers for use in measuring and recording the elongation of a specimen under test in a materials testing machine.

In measuring and recording the elongation of a specimen stressed in a materials testing machine, an extensometer capable of magnifying small displacements is normally used. Such instruments are usually restricted to a very limited range of elongation in order to obtain sufficient magnification, sensitivity, and accuracy. Thus, in a test involving extensive elongation of the specimen, the conventional extensometer gives a magnified measurement of the deformations in the early part of the test only, while post-test direct measurements of the specimen are needed to determine the complete elongation. In the case of a tension test of a steel specimen to rupture, a sensitive extensometer and one capable of high magnification is initially needed to indicate the small deformations occurring in the elastic range. When the test continues beyond the yield point, high elongation capacity in place of high magnification is required of the extensometer. In the region beyond the yield point, the slope of the stress-strain curve is quite low compared to that of the elastic region and portions immediately beyond it. These characteristics of steel specimens, as an example, go to show the particular measurement problems that the extensometer must overcome.

One of the objects of the present invention is to provide an extensometer for use in accurately measuring and recording the elongations of a specimen stressed in a materials testing machine over a large range of elongation.

Another of the objects of this invention is to provide an extensometer for the above purpose which measures and records the elongation of a specimen initially at one degree of magnification and subsequently at a different degree of magnification.

In one aspect of the invention, when the specimen is strained beyond a given point, the effective lever arm of an extensometer lever system is abrutply changed, thereby enabling a single extensometer to more effectively cover a broad range of elongation. This can be accomplished by an extensometer including a supporting frame with a fixed gauge point attached to the frame. A moveable gauge point is mounted on a lever which is pivotally attached to the frame, both of the gauge points contacting a test specimen. A second lever is pivotally attached to the supporting frame rotating in the same general plane as the first lever, along which are placed two bearing means or two projections, one or the other of which contacts the second lever, so that as the first lever rotates due to elongation of the specimen, the resultant lever arm of the two levers will change in length upon contact to the second lever, changing from one to the other of the bearing means or projections. A moveable pick-up or signal means may be suitably mounted on the supporting frame and connected to the second lever so as to be displaced in response to movement of the moveable gauge point and thereby provide a signal for measuring the deformation of a stressed specimen.

Other objects, advantages and features of the invention will become apparent from the following description and drawings which are merely exemplary.

In the drawings:

Fig. 1 is a top plan view of an extensometer embodying the present invention.

Fig. 2 is a vertical sectional view of the extensometer as viewed in direction of the arrows 2—2 on Fig. 1.

Fig. 3 is a fragmentary vertical sectional view of the extensometer showing the extensometer after limited elongation of the specimen.

Fig. 4 is a fragmentary vertical sectional view of the extensometer showing the extensometer after large elongation of the specimen.

Fig. 5 is an end elevational sectional view of the extensometer as viewed in the direction of the arrows 5—5 on Fig. 2.

Fig. 6 is an end elevational sectional view of the extensometer as viewed in the direction of the arrows 6—6 of Fig. 1.

Fig. 7 is a fragmentary end elevational view of the extensometer as viewed in the direction of the arrows 7—7 in Fig. 2.

The extensometer is generally shown in Figs. 1 and 2. To frame 8, there is attached bracket 9 by means of screw 10. Fixed knife edge 11 which is attached to bracket 9 by screws 12, contacts the upper portion of the specimen 13, which is stressed in a conventional testing machine (not shown). Lever 14 is pivotally attached to frame 8 by means of pin 15. Moveable knife edge 16 is adjustably mounted on lever 14 and is attached by screw 17. Spring 18 forces lever 14 so that moveable knife edge 16 is urged in the direction of fixed knife edge 11.

As shown in Fig. 7, stop 19 is mounted on bracket 9 and serves to limit the upward travel of knife edge 16 caused by the upward motion of lever 14. Stop 19 is secured to bracket 9 by means of screw 20 which is in turn locked by set screw 21. The lower edge 22 of stop 19 contacts the upper surface 23 of moveable knife edge 16, when the knife edge is in its uppermost position. Upon assembly of the instrument, the lower edge 22 is adjusted so that contact of moveable knife edge 16 with stop 19 locates the moveable knife edge initially at the required gauge length from the fixed knife edge 11.

As shown in Figs. 1 and 5, plate 24 containing slot 25 is attached to frame 8 by means of attaching screw 26. Slide 27 is fitted into slot 25 and to it is attached block 28 by means of screw 29. Plate 24 (Figs. 1 and 6) contains a slot 30 beginning at point 31 and extending toward its free end. Lug 32 attached to block 28 by means of plate 33 and screw 34 serve to guide block 28 with respect to slot 30 in plate 24. To the free end of plate 24 is attached plate 35 by means of screws 36. Plate 35 contains a tapped hole 37 so as to receive adjusting screw 38, whose linear motion is transmitted to spring 39 through collar 40 which is free to turn upon screw 38. Movement of adjusting screw permits block 28 to be positioned toward specimen 13. Resilient bracket 41 mounted on block 28 by means of screw 42 transmits motion of block 28 to clamp 43 so as to hold the knife edges firmly against the test specimen. Screw 44 and lock nut 45 serve to attach the resilient bracket 41 to clamp 43. Spring 39 permits clamp 43 to be preloaded against specimen 13 by adjustment of screw 38.

Screw 26 holds plate 24 to frame 8. By grapping extension 46 of slide 27, the slide may be moved so as to open the gap between the edges 47 and 48 of clamp 43 and the knife edges. Screw 38 can be used to adjust the tension on different sizes of specimens.

An additional lever 49 (Fig. 2) is pivotally attached to frame 8 by means of flat spring 50 which is secured to lever 49 by screw 51. The fixed end of spring 50 is mounted on frame 8 by means of support 52. Support 52 is held to frame 8 by mounting screw 53 while set screw 54 permits the angle between support 52 and frame 8 to be properly adjusted. Flat spring 50 forces lever 49 toward lever 14. Balls 55 and 56 are mounted on lever 14 by means of sockets 57 and 58. Under the urging of spring 50, surface 59 of lever 49 is in contact with ball 55. Lever 49 is provided with ball 60 on its upper surface. Pick-up device 61 is mounted on support 8. This device may be a differential transformer whose core 62 rests on ball 60 by means of extension 63 and follower 64. The winding of the transformer 65 surrounds core 62 in the conventional manner.

In operation, the specimen 13 may be stressed in tension by the testing machine. Knife edges 11 and 16 are held in firm contact with specimen 13 by the force due to the action of clamp 43. Upon elongation of specimen 13, lever 14 as viewed in Fig. 2, begins a downward motion from its initial position in which upper surface 23 of knife edge 16 was resting on surface 22 of stop 19. The downward movement of lever 14 is opposed by restraint of spring 18 at its pivot point. Under the force of spring 50, lever 49 is held in contact at its surface 59 with ball 55. Since core 62 of the differential transformer 61 is biased in a downward direction by a spring not shown, follower 64 remains in contact with ball 60 as lever 49 moves in a downward direction.

Since ball 55 is positioned along the lever 14 in from the free end of the lever, the ball 55 experiences less linear motion than that of knife edge 16 as the specimen 13 is elongated. Thus, the elongation of specimen 13 is partially reduced as indicated at ball 55. In a similar manner, ball 60 of lever 49 is located in from the point on surface 59 which rests on ball 55. Thus, at ball 60, the motion of knife edge 16 has been further reduced. Consequently, core 62 of pick-up 61 merely travels a fraction of the distance travelled by knife edge 16. The reduced motion of the core is fully compensated for by suitable electrical amplification so that the initial small deformations of specimen 13 are clearly and accurately indicated.

Fig. 3 shows the specimen and extensometer after specimen 13 has been elongated to a marked extent. This could occur in testing a steel specimen when the stress applied to the specimen has been carried appreciably beyond the yield point. In further considering the example of a test involving a steel specimen, it is well known that the slope of the stress-strain characteristic is of a much smaller value beyond the yield point. For this reason, the magnification of the extensometer could be greatly reduced and yet give usable indication. As shown in Fig. 3, knife edge 16 has moved downward until spherical surface 66 is nearly contacting ball 56. When surface 66 contacts ball 56 and further movement of lever 14 occurs, surface 59 of lever 49 will lose contact with ball 55. Adjustment of set screw 54 determines the position the pivot point of flat spring 50 for lever 49 which in turn determines the elongation of specimen 13 that is required to cause a transfer of lever 49 from resting on ball 55 to ball 56.

Fig. 4 shows the extensometer after the specimen 13 has been extensively elongated in a test wherein tensile rupture is approached. Due to the reducing action of levers 14 and 49, it is evident that knife edge 16 can experience very large displacement yet with a minimum of displacement for extension 63 of pick-up 61.

Lever 14 moves downward until ball 55 loses contact with surface 59 of lever 49. Spherical surface 66 of lever 14 then rests upon ball 56. It is apparent that a second form of the original compound lever system has been established. Since ball 56 is greatly removed from the free end of lever 14 and since the free end of lever 49 in contact with ball 56 is at appreciable distance from ball 60, a much greater reduction of the indicated travel of knife edge 16 has been effected. As shown in the figures, the change in the reduction from the first to the second form of the compound lever systems is of a factor of approximately ten.

In the case where large elongation has occurred, it is necessary for the frame 8 to rotate slightly clockwise as viewed in Fig. 4 so that knife edge 16 may remain in contact with specimen 13. Resilient bracket 41 flexes sufficiently to allow the frame to rotate and yet keep clamp 43 against the specimen 13.

It is to be understood that details of the invention can be changed and modifications may be effected therein without departing from the scope or spirit of the invention, except as defined in the appended claims.

What is claimed is:

1. In a device for providing signals in response to changes of dimension of a specimen being tested, the combination including specimen dimension responsive change means, a pair of lever means actuated by said responsive means, signal means actuated by one of said lever means, and a plurality of bearing means on one of said lever means adapted to contact the other lever means, one of said bearing means being contacted by the other lever means at a time so that the effective lever arm will be changed.

2. In a device for measuring the deformation of a stressed specimen, the combination including supporting means, fixed gauge point means attached to said supporting means, moveable gauge point means mounted on lever means pivotally attached to said supporting means, said fixed and said moveable gauge point means contacting said specimen, second lever means pivotally attached to said supporting means and rotatable in the same general plane as said first lever means, projection means on one of said levers, second projection means on one of said lever means in spaced relationship along the length of said lever means from said first projection, each one of said projection means on one of said lever means alone contacting the other of said lever means for a portion of all positions of said first lever means, the total of said portions equaling all positions of said first lever means, so that upon angular movement of said first lever means, the resultant lever arm of said first and said second lever means will change in length upon contact to the other lever means, changing from said first to said second projection means, and moveable pick-up means mounted on said supporting means and connected to said second lever means to be displaced relative to said supporting means in response to displacement of said moveable gauge point means.

3. In a device for measuring the deformation of a stressed specimen, the combination including supporting means, fixed gauge point means attached to said supporting means, moveable gauge point means mounted on first lever means pivotally attached to said supporting means, said fixed and said moveable gauge point means contacting said specimen, second lever means pivotally attached to said supporting means and rotatable in the same plane as said first lever means, a plurality of projection means spaced along the length of said lever means, each one of said projection means on one of said lever means alone contacting the other of said lever means for a range of positions of said first lever means so that upon angular movement of said first lever means the resultant lever arm of said first and said second lever means will vary incrementally in length for each projection means contacting a lever means, and moveable pick-up means mounted on said supporting means and connected to said second lever means to be displaced relative to said supporting means in response to displacement of said moveable gauge point means.

4. In a device for measuring the deformation of a stressed specimen, the combination including supporting means, fixed gauge point means attached to said supporting means, moveable gauge point means mounted on lever means pivotally attached to said supporting means, said fixed and said moveable gauge point means contacting said specimen, a plurality of additional lever means pivotally attached to said supporting means and rotatable in the same plane as said lever means, said plurality of lever means forming a compound lever means with said lever means, a plurality of projection means in spaced relationship along the length of said lever means, each one of said plurality of projection means alone contacting the adjacent lever means of said plurality of lever means for a portion of all positions of said lever means, the total of said portions equaling all positions of said lever means, so that upon angular movement of said lever means, the resultant lever arm of said lever means and said plurality of lever means will change in length upon contact to said adjacent lever means changing from one to another of said projection means, and moveable pick-up means mounted on said supporting means and connected to one of said plurality of lever means to be displaced relative to said supporting means in response to displacement of said moveable gauge point means.

5. In a device for measuring the deformation of a stressed specimen, the combination including supporting means, fixed gauge point means attached to said supporting means, moveable gauge point means mounted on lever means pivotally attached to said supporting means, clamping means holding said gauge points in contact with said specimen, adjustable resilient bracket means attaching said clamping means to said supporting means, a second lever means pivotally attached to said supporting means and rotatable in the same plane as said first lever means, projection means on one of said levers, second projection means on one of said lever means in spaced realtionship along the length of said lever means from said first projection, each one of said projection means on one of said lever means alone contacting the other of said lever means for a portion of all positions of said first lever means, the total of said portions equaling all positions of said first lever means, so that upon angular movement of said first lever means, the resultant lever arm of said first and said second lever means will change in length upon contact to the other lever means changing from said first to said second projection means, and moveable pick-up means mounted on said supporting means and connected to said second lever means to be displaced relative to said supporting means in response to displacement of said moveable gauge point means.

6. In a device for measuring the deformation of a stressed specimen, the combination including supporting means, fixed gauge point means attached to said supporting means, moveable gauge point means mounted on first lever means pivotally attached to said supporting means, said fixed and said moveable gauge point means contacting said specimen, second lever means pivotally attached to said supporting means and rotatable in the same plane as said first lever means, bearing means on one of said lever means, said bearing means contacting said other lever means, so that upon angular movement of said first lever means, the resultant lever arm of said first and second lever means will vary in length for each portion of said cam means contacting said second lever means, and moveable pick-up means mounted on said supporting means and connected to said second lever means to be displaced relative to said supporting means in response to displacement of said moveable gauge point means.

7. In a device for measuring the deformation of a stressed specimen, the combination including supporting means, fixed gauge point means attached to said supporting means, moveable gauge point means mounted on lever means pivotally attached to said supporting means, said fixed and said moveable gauge point means contacting said specimen, second lever means, pivotal mounting means for said second lever means adjustably attached to said supporting means, said second lever rotatable in the same plane as said first lever means, projection means on one of said levers, second projection means on one of said lever means in spaced relationship along the length of said lever means from said first projection, each one of said projection means on one of said lever means alone contacting the other of said lever means for a portion of all positions of said first lever means, the total of said portions equaling all positions of said first lever means, so that upon angular movement of said first lever means, the resultant lever arm of said first and said second lever means will change in length upon contact to the other lever means changing from said first to said second projection means, as set by the attachment of said pivotal mounting means and moveable pick-up means mounted on said supporting means and connected to said second lever means to be displaced relative to said supporting means in response to displacement of said moveable gauge point means.

8. In an extensometer, the combination including supporting means, fixed knife edge means attached to said supporting means, moveable knife edge means mounted on lever means pivotally attached to said supporting means, clamping means holding said knife edges in contact with a specimen, adjustable resilient bracket means attaching said clamping means to said supporting means, a second lever means pivotally attached to said supporting means between said specimen and the pivotal attachment of said first lever means, projection means on one of said lever means, second projection means on one of said lever means in spaced relationship along the length of said lever means from said first projection means, so that upon angular movement of said first lever means, the resultant lever arm of said first and said second lever means will change in length upon contact to the other lever means changing from said first to second projection means, and moveable pick-up means mounted on said supporting means and connected to said second lever means to be displaced relative to said supporting means in response to displacement of said moveable knife edge.

9. In an extensometer, the combination including supporting means, fixed knife edge means attached to said supporting means, moveable knife edge means mounted on lever means pivotally attached to said supporting means, clamping means having portions for engaging a specimen substantially opposite said knife edges, adjustable resilient bracket means attaching said clamping means to said supporting means, a second lever means pivotally attached to said supporting means between said specimen and the pivotal attachment of said first lever means, a plurality of projection means of circular cross-section spaced along the length of said first lever means, one of said projection means contacting said second lever means for a range of positions of said first lever means so that upon angular movement of said first lever means, the resultant lever arm of said first and said second lever means will change in length upon said second lever means changing contact from one of said plurality of projection to another, and moveable pick-up means mounted on said supporting means and connected to said second lever means to be displaced relative to said supporting means in response to displacement of said moveable gauge point means, and differential transformer means actuated by said pick-up means to emit varying electrical currents corresponding to displacements of said pick-up means.

10. In an extensometer, the combination including a supporting means, fixed knife edge means attached to said supporting means, moveable knife edge means mounted on lever means pivotally attached to said supporting means, resilient means loading said lever so as to urge said moveable knife edge toward said fixed knife edge, a second lever means pivotally attached to said supporting means between said specimen and the pivotal attachment of said first lever means, other resilient means loading said second lever means so as to urge said second lever means toward said lever means, projection means on one of said lever means, second projection means on one of said lever means in spaced relationship along the length of said lever means from said first projection means, so that upon angular movement of said first lever means, the resultant lever arm of said first and said second lever means will change in length upon contact to the other lever means changing from said first to second projection means, and moveable pick-up means mounted on said supporting means and connected to said second lever means to be displaced relative to said supporting means in response to displacement of said moveable knife edge.

References Cited in the file of this patent
FOREIGN PATENTS 558,505    Germany _____ Sept. 8, 1932